United States Patent [19]

Kurihara

[11] Patent Number: 4,606,607
[45] Date of Patent: * Aug. 19, 1986

[54] PHOTOGRAPHIC LENS SYSTEM WITH A SHORT OVERALL LENGTH

[75] Inventor: Takashi Kurihara, Tokyo, Japan

[73] Assignee: Olympus Optical Co., Ltd., Tokyo, Japan

[*] Notice: The portion of the term of this patent subsequent to Jun. 4, 2002 has been disclaimed.

[21] Appl. No.: 568,147

[22] Filed: Jan. 4, 1984

[30] Foreign Application Priority Data

Jan. 27, 1983 [JP] Japan .................... 58-10543

[51] Int. Cl.$^4$ .................... G02B 13/08; G02B 9/34
[52] U.S. Cl. .................... 350/432; 350/469
[58] Field of Search .................... 350/432, 469, 433-435

[56] References Cited

U.S. PATENT DOCUMENTS

| | | | |
|---|---|---|---|
| 3,951,523 | 4/1976 | Nishimoto | 350/432 |
| 3,998,527 | 12/1976 | Ikeda et al. | 350/432 |
| 4,359,271 | 11/1982 | Mihara | 350/432 |
| 4,368,956 | 1/1983 | Yamada et al. | 350/432 |
| 4,373,786 | 2/1983 | Yamada | 350/432 |
| 4,413,888 | 11/1983 | Sato | 350/432 |
| 4,443,069 | 4/1984 | Mihara | 350/432 X |
| 4,521,084 | 6/1985 | Kurihara | 350/432 |

FOREIGN PATENT DOCUMENTS 57-38409 3/1982 Japan .
57-116313 7/1982 Japan .

Primary Examiner—John K. Corbin
Assistant Examiner—Scott J. Sugarman
Attorney, Agent, or Firm—Cushman, Darby & Cushman

[57] ABSTRACT

A photographic lens system with a short overall length comprising a first, second, third and fourth lens components, in which the first lens component is a positive meniscus lens, the second lens component is a biconcave lens, the third lens component is a biconvex lens, and the fourth lens component is a negative meniscus lens, and in which at least one of respective surfaces of the first, second and third lens components and at least one of respective surfaces of the fourth lens component are arranged as aspherical surfaces, the photographic lens system having a large aperture ratio and well corrected aberrations.

7 Claims, 8 Drawing Figures

PHOTOGRAPHIC LENS SYSTEM WITH A SHORT OVERALL LENGTH

BACKGROUND OF THE INVENTION (a) Field of the Invention

The present invention relates to a photographic lens system with a short overall length of which the field angle is about 64° and aperture ratio is large, i.e., the F-number is 2.8.

(b) Description of the Prior Art

As wide angle lens systems of four-element lens configuration with short overall lengths and telephoto ratios about 1.0, telephoto type lens systems with the following lens composition are known, i.e., such lens composition that a negative meniscus lens which is concave toward the object side is arranged in rear of and at a slightly distant position from a triplet type lens system. However, most of this kind of lens system have a small aperture ratio, i.e., F/3.5, like the lens system shown in Japanese published unexamined patent application No. 38409/82. In case of lens systems of this type having a large aperture ratio, i.e., F/2.8, astigmatism are caused by rays of intermediate image hieght and coma flare occurs in the position from the intermediate portion toward the marginal portion.

SUMMARY OF THE INVENTION

It is, therefore, a primary object of the present invention to provide a photographic lens system with a short overall length having a four-component four-element lens configuration in which a negative meniscus lens is arranged in rear of a triplet type lens system and in which the radius of curvature of the surface on the object side of the second lens component is made large, spherical aberration caused thereby is corrected by arranging at least one of respective surfaces of the first through the third lens components as an aspherical surface and, moreover, aberrations especially spherical aberration are corrected by arranging at least one of both surfaces of the fourth lens component as an aspherical surface, said photographic lens system with a short overall length having a field angle about 64°, F-number 2.8 and telephoto ratio about 1.0.

The photographic lens system according to the present invention has a lens configuration as shown in FIG. 1, i.e., it comprises a first, second, third and fourth lens components in which the first lens component is a positive meniscus lens arranged to be convex toward the object side, the second lens component is a biconcave lens, the third lens component is a biconvex lens, and the fourth lens component is a negative meniscus lens arranged to be concave toward the object side, and in which at least one of respective surfaces of the first, second and third lens components and at least one of both surfaces of the fourth lens component are formed as aspherical surfaces.

In case of a lens system with a lens configuration as shown in FIG. 1, astigmatism is caused as the radius of curvature of the surface on the object side of the second lens component is made small in order to correct spherical aberration caused by the first lens component. That is, when the radius of curvature of the surface $r_3$ on the object side of the second lens component is made small, the incident angle $\alpha$ when the principal ray 1, which goes toward the intermediate image height, is incident on said surface $r_3$ becomes large and, consequently, astigmatism occurs. To prevent astigmatism, it is effective when the radius of curvature of said surface is made as large as possible. In that case, however, the correcting effect for spherical aberration becomes weak and, as a result, spherical aberration is undercorrected.

In the photographic lens system according to the present invention, astigmatism is prevented from occurring by making the radius of curvature of the above-mentioned surface as large as possible and, on the other hand, at least one of respective surfaces of the first, second and third lens components, which have large influence on paraxial rays as it will be understood from FIG. 1, is formed as an aspherical surface in order to thereby correct spherical aberration. At that time, it is preferable to arrange that an aspherical surface formed so that the diverging effect becomes larger toward the outer portion of the surface is adopted for the second lens component which has large influence on correction of spherical aberration. That is, as shown in FIG. 3, the paraxial ray $l_1$ is directed toward $l_1'$ when it is diverged by the reference spherical surface $r_3$ shown by the broken line while it is directed toward $l_1''$ when it is diverged by the aspherical surface $r_3'$ shown by the solid line. Therefore, when the aspherical surface is used, spherical aberration is corrected from A to B.

On the other hand, as the reference spherical surface $r_3$ is arranged so that its radius of curvature is large and as the principal ray 1 passes the central portion of the surface where the influence of the aspherical surface is small, the incident angle $\alpha'$ is small and, consequently, astigmatism becomes small. In other words, when the abovementioned aspherical surface is provided, it is possible to correct spherical aberration favourably by preventing astigmatism from occurring.

The above-mentioned aspherical surface is expresses by the formula shown below where reference symbol $r_i$ represents the radius of curvature of the vertex portion of the aspherical surface (radius of curvature of the reference spherical surface), reference symbol x represents the distance from an arbitrary point on the aspherical surface to the tangential plane which is tangential to the aspherical surface at the vertex thereof, and reference symbol y represents the distance from the above-mentioned arbitrary point to the x axis (optical axis):

$$x = \frac{\frac{y^2}{r_i}}{1 + \sqrt{1 - \left(\frac{y}{r_i}\right)^2}} + \Delta x_i$$

$$\Delta x_i = A_2^{(i)} y^2 + A_4^{(i)} y^4 + A_6^{(i)} y^6 + A_8^{(i)} y^8 + A_{10}^{(i)} y^{10}$$

where, reference symbols $A_2^{(i)}$, $A_4^{(i)}$, ... $A_{10}^{(i)}$ respectively represent coefficients of aspherical surface.

In this case, as described before, it is preferable to arrange that the radius of curvature $r_3$ of the surface on the object side of the second lens component (reference spherical surface for the aspherical surface) fulfills the condition (3) shown later, i.e., to arrange that $r_3$ has a large absolute value. Besides, when the aspherical surface largely deviates from the reference spherical surface, spherical aberration will be overcorrected and, moreover, it is difficult to form the aspherical surface. Therefore, it is preferable to arrange that the deviation in x axis direction of the aspherical surface from the reference spherical surface at the maximum effective diameter fulfills the condition (1) shown below, i.e., to arrange that the value $\Delta x_3'$ of $\Delta x_3$ in the aforementioned formula of aspherical surface at the maximum effective diameter fulfills the condition (1) shown below:

$$-2.5 \times 10^{-3} < \Delta x_3'/f < 0 \quad (1)$$

where, reference symbol f represents the focal length of the lens system as a whole.

If, in the condition (1), it becomes $\Delta x_3'/f < -2.5 \times 10^{-3}$, the deviation of the aspherical surface from the reference spherical surface becomes too large, and spherical aberration will be overcorrected. Besides, it becomes difficult to manufacture the aspherical lens. If it becomes $\Delta x_3'/f > 0$, power becomes weaker toward the marginal portion of the lens and, consequently, the correcting effect for spherical aberration will be lost.

On the other hand, to eliminate coma flare in the portion from the central portion toward the marginal portion of image, at least one of the two surfaces of the fourth lens component is arranged as an aspherical surface in the photographic lens system according to the present invention. At the fourth lens component, offaxial rays and paraxial rays pass it at quite different heights as shown in FIG. 1. Therefore, by adopting an aspherical surface for the fourth lens component, it is possible to eliminate coma flare without giving influence on spherical aberration. At that time, offaxial rays becomes incident on the surface on the object side of the fourth lens component approximately perpendicularly to said surface and, consequently, almost no astigmatism is caused at said surface. Therefore, when said surface is arranged as an aspherical surface, it is possible to eliminate coma flare without causing influence on astigmatism. In other words, when the upper ray $l_2$ of offaxial rays intersects the principal ray 1 at a point C which is in front of the image surface as shown in FIG. 4, it is possible to eliminate coma flare by adopting an aspherical surface $r_7'$ of which the diverging effect becomes stronger toward the outer portion thereof. On the other hand, when the upper ray of offaxial rays intersects the principal ray at a point in rear of the image surface, it is possible to eliminate coma flare when an aspherical surface of which the diverging effect decreases toward the outer portion thereof.

Therefore, when the surface on the object side of the fourth lens component is formed as an aspherical surface, it is preferable to arrange that the deviation $\Delta x_7'$ in x axis direction of said aspherical surface from the reference spherical surface at the position of the maximum effective diameter fulfills the condition (2) shown below:

$$\left| \frac{\Delta x_7'}{f} \right| < 5.5 \times 10^{-3} \quad (2)$$

If the condition (2) is not fulfilled, the offaxial principal ray will be subjected to the influence of the aspherical surface and, consequently, astigmatism will become unfavourable.

As described so far, by making the radius of curvature of the surface on the object side of the second lens component large and, at the same time, arranging at least one of respective surfaces of the first, second and third lens components as an aspherical surface, it is possible to obtain a photographic lens system which enables to attain the object of the present invention.

However, it is more preferable when the surface on the object side of the second lens component is arranged as an aspherical surface, the radius of curvature $r_3$ of the reference spherical surface for said aspherical surface is arranged to fulfill the condition (3) shown below and, at the same time, Abbe's numbers $\nu_1$ and $\nu_2$ of the first and second lens components and the thickness $d_5$ of the third lens component fulfill the conditions (4) and (5) shown below:

$$r_3 < -1.3f \quad (3)$$

$$\nu_1 - \nu_2 > 20 \quad (4)$$

$$0.07f < d_5 < 0.15f \quad (5)$$

As described before, if the radius of curvature of the surface on the object side of the second lens component becomes small and does not fulfill the condition (3), astigmatism occurs at the intermediate image height.

Furthermore, chromatic aberration of spherical aberration caused by the first lens component (convex lens) is corrected by the second lens component (concave lens). For this purpose, it is necessary to make Abbe's number $\nu_1$ of the first lens component large and Abbe's number $\nu_2$ of the second lens component small, and it is preferable to arrange that the condition (4) is fulfilled. Therefore, when the condition (4) is not fulfilled, chromatic aberration of spherical aberration occurs.

Besides, astigmatic difference in the portion from the central portion toward the marginal portion of image becomes smaller when the thickness $d_5$ of the third lens component is larger. Therefore, when $d_5$ becomes smaller than the lower limit of the condition (5), astigmatic difference becomes large, and this is not desirable. However, as the principal ray is considerably refracted upward by the third lens component as it is evident from FIG. 1, lateral chromatic aberration becomes large if the third lens component is made too thick and $d_5$ becomes larger than the upper limit of the condition (5).

DETAILED DESCRIPTION OF THE PREFERRED EMBODIMENTS

Figure 1:
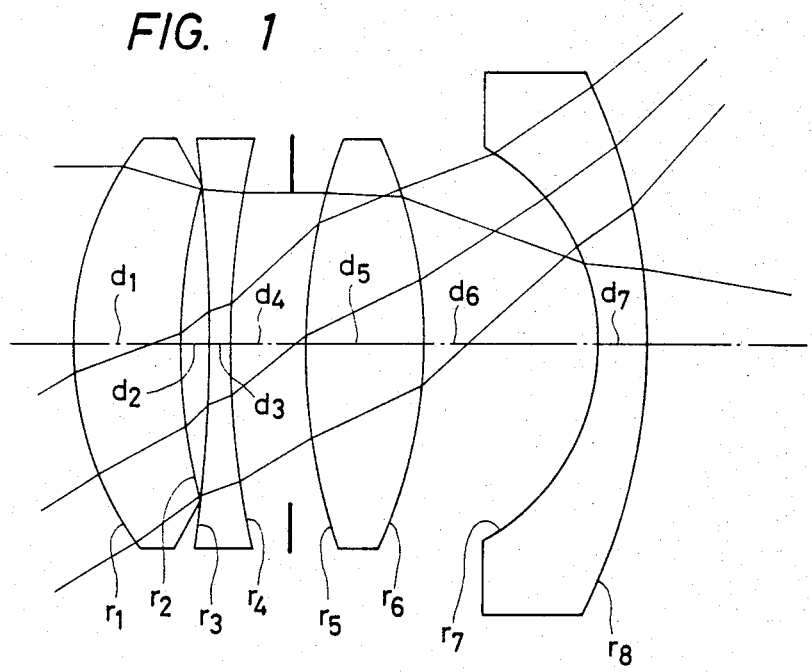
FIG. 1 shows a sectional view of the photographic lens system according to the present invention.
Figure 2:
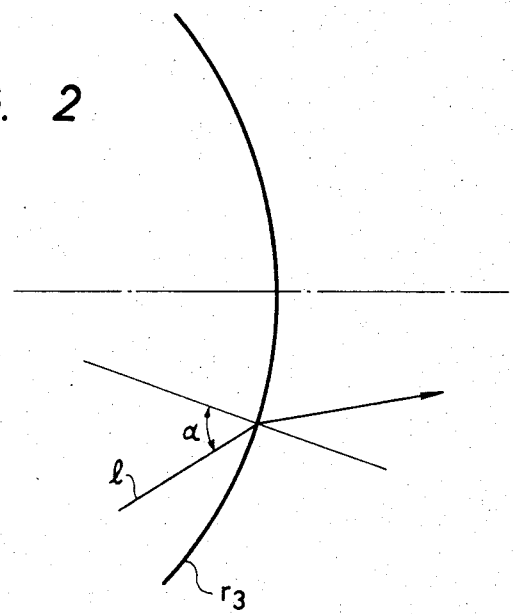
FIG. 2 shows an explanatory figure illustrating the state of refraction of the principal ray by the surface on the image side of the second lens component.
Figure 3:
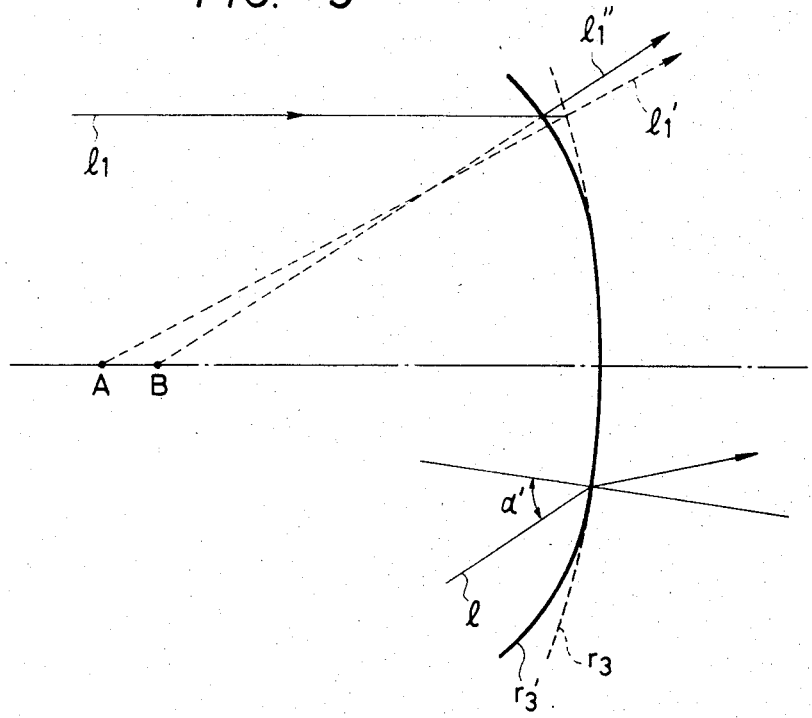
FIG. 3 shows an explanatory figure illustrating the state of correction of aberrations by the aspherical surface formed on the object side of the second lens component.
Figure 4:
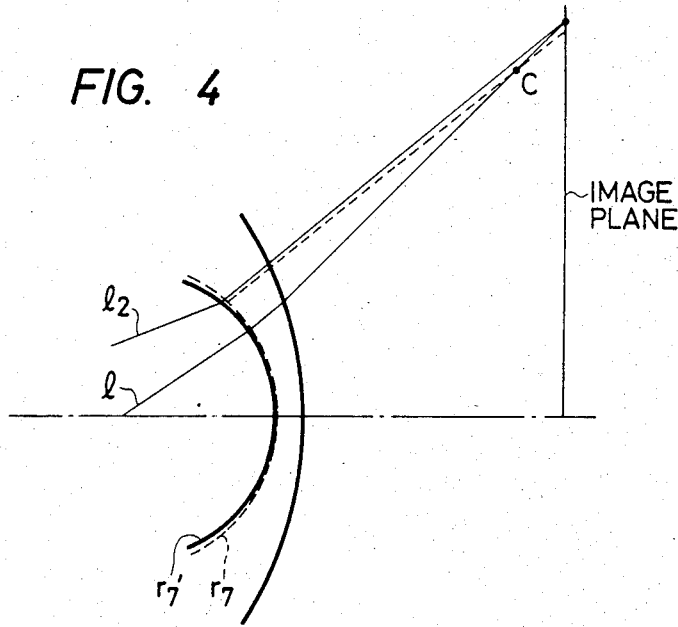
FIG. 4 shows an explanatory figure illustrating the state of correction of aberrations by the aspherical surface formed on the object side of the fourth lens component.
Figure 5:
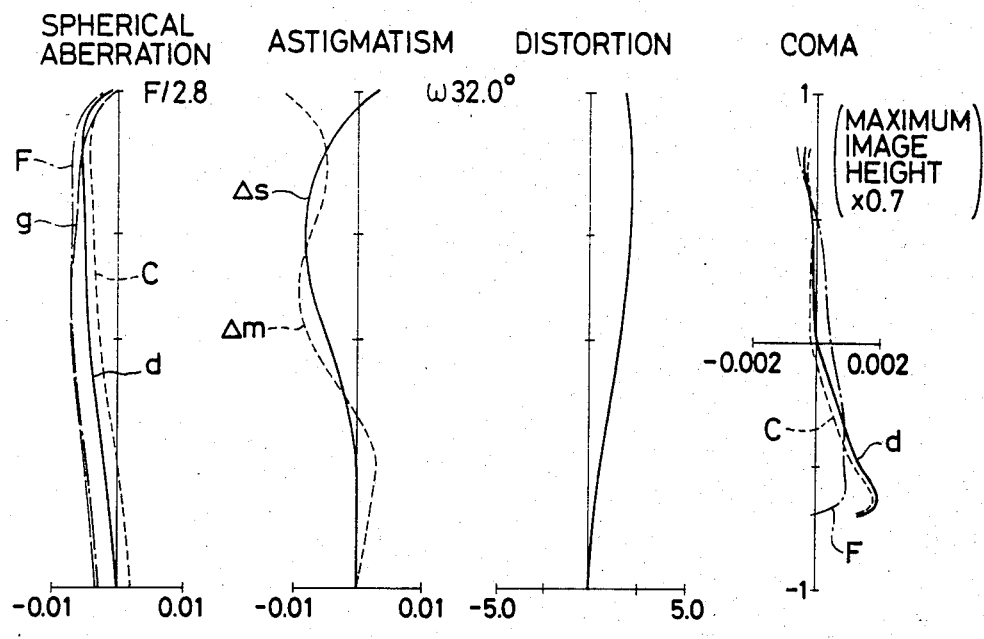
FIGS. 5 through 8 respectively show graphs illustrating aberration curves of Embodiments 1 through 4 of the photographic lens system according to the present invention.
Figure 6:
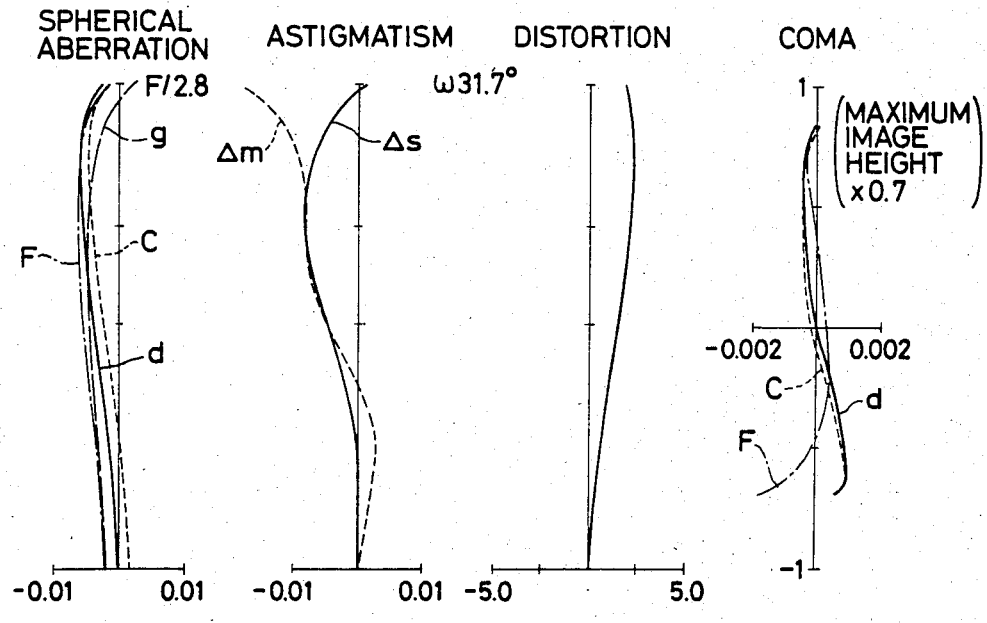
Figure 7:
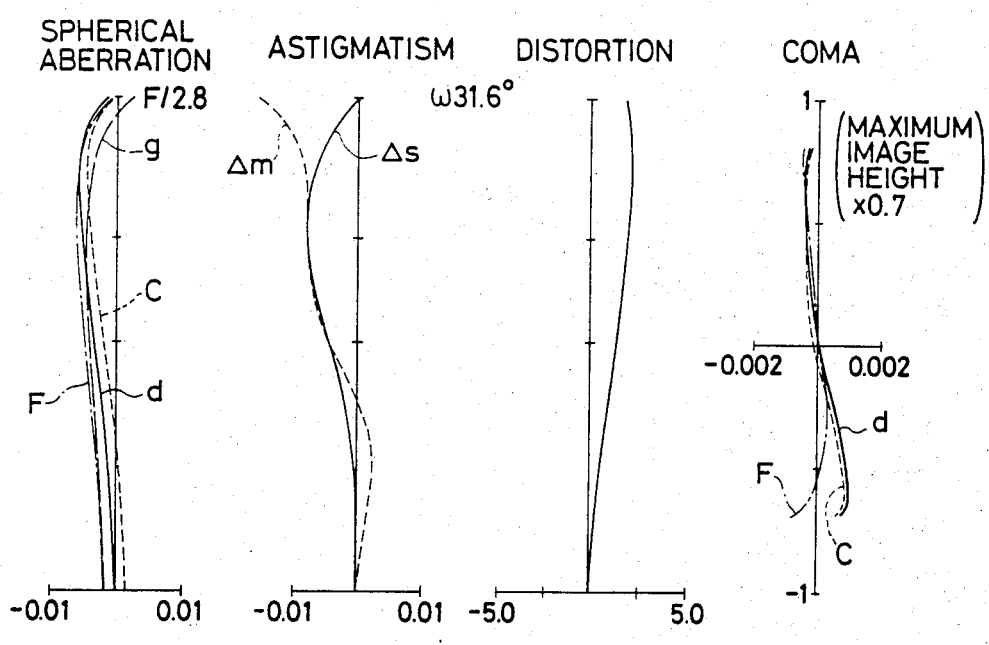
Figure 8:
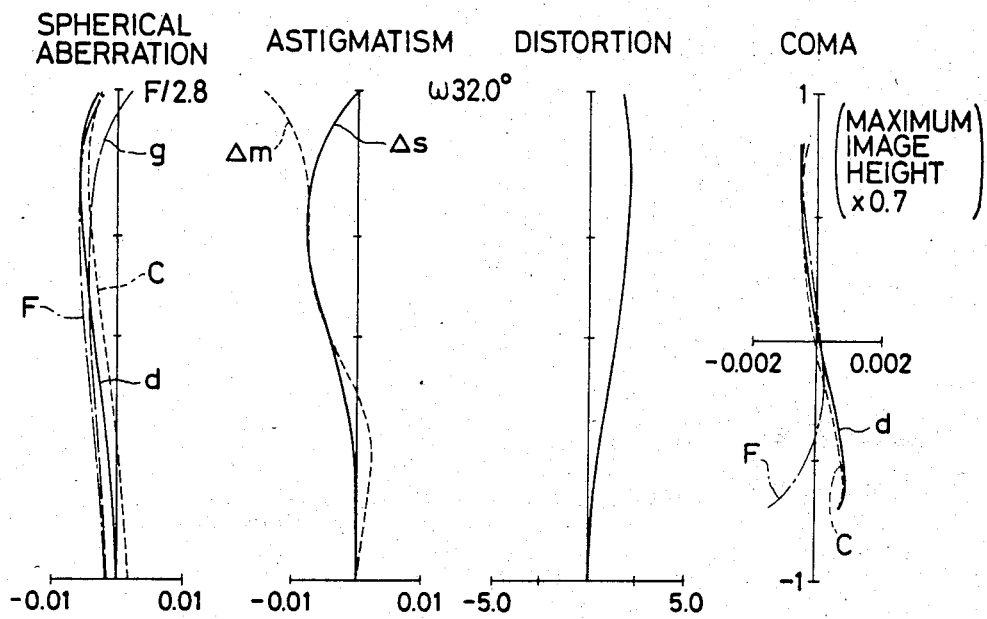

Now preferred embodiments of the photographic lens system with a short overall length according to the present invention described so far are shown below.

Embodiment 1
$f = 1$, $F/2.8$, $2\omega = 64.1°$

| | | |
|---|---|---|
| $r_1 = 0.340$ | | |
| $d_1 = 0.115$ | $n_1 = 1.77250$ | $\nu_1 = 49.66$ |
| $r_2 = 0.666$ | | |
| $d_2 = 0.025$ | | |
| $r_3 = -2.056$ (aspherical surface) | | |
| $d_3 = 0.023$ | $n_2 = 1.80519$ | $\nu_2 = 25.43$ |
| $r_4 = 0.721$ | | |
| $d_4 = 0.071$ | | |
| $r_5 = 0.588$ | | |
| $d_5 = 0.128$ | $n_3 = 1.51742$ | $\nu_3 = 52.41$ |
| $r_6 = -0.464$ | | |
| $d_6 = 0.196$ | | |
| $r_7 = -0.219$ (aspherical surface) | | |
| $d_7 = 0.047$ | $n_4 = 1.48749$ | $\nu_4 = 70.15$ |
| $r_8 = -0.552$ | | | coefficient of aspherical surface
$A_2^{(3)} = 0$, $A_4^{(3)} = -1.612$, $A_6^{(3)} = -7.141 \times 10^1$,
$A_8^{(3)} = 2.840 \times 10^3$, $A_{10}^{(3)} = -4.707 \times 10^4$,
$A_2^{(7)} = 0$, $A_4^{(7)} = -3.676$, $A_6^{(7)} = 4.309 \times 10^2$,
$A_8^{(7)} = -1.483 \times 10^4$, $A_{10}^{(7)} = 2.300 \times 10^5$
$\Delta x_3' = -1.429 \times 10^{-3}$
$\Delta x_7' = 4.861 \times 10^{-3}$
$\nu_1 - \nu_2 = 24.23$
telephoto ratio 1.00

Embodiment 2
$f = 1$, $F/2.8$, $2\omega = 63.4°$

| | | |
|---|---|---|
| $r_1 = 0.315$ | | |
| $d_1 = 0.108$ | $n_1 = 1.74100$ | $\nu_1 = 52.68$ |
| $r_2 = 0.547$ | | |
| $d_2 = 0.029$ | | |
| $r_3 = -1.703$ (aspherical surface) | | |
| $d_3 = 0.023$ | $n_2 = 1.84666$ | $\nu_2 = 23.88$ |
| $r_4 = 0.984$ | | |
| $d_4 = 0.070$ | | |
| $r_5 = 0.566$ | | |
| $d_5 = 0.116$ | $n_3 = 1.51742$ | $\nu_3 = 52.41$ |
| $r_6 = -0.456$ | | |
| $d_6 = 0.177$ | | |
| $r_7 = -0.211$ (aspherical surface) | | |
| $d_7 = 0.050$ | $n_4 = 1.48749$ | $\nu_4 = 70.15$ |
| $r_8 = -0.563$ | | | coefficient of aspherical surface
$A_2^{(3)} = 0$, $A_4^{(3)} = -2.143$, $A_6^{(3)} = -3.757 \times 10^1$,
$A_8^{(3)} = 1.263 \times 10^3$, $A_{10}^{(3)} = -2.275 \times 10^4$
$A_2^{(7)} = 0$, $A_4^{(7)} = -3.199$, $A_6^{(7)} = 3.664 \times 10^2$,
$A_8^{(7)} = 1.348 \times 10^4$, $A_{10}^{(7)} = 2.350 \times 10^5$
$\Delta x_3' = -1.606 \times 10^{-3}$
$\Delta x_7' = 3.110 \times 10^{-3}$
$\nu_1 - \nu_2 = 28.8$
telephone ratio 1.00

Embodiment 3
$f = 1$, $F/2.8$, $2\omega = 63.2°$

| | | |
|---|---|---|
| $r_1 = 0.300$ | | |
| $d_1 = 0.084$ | $n_1 = 1.69680$ | $\nu_1 = 55.52$ |
| $r_2 = 0.585$ | | |
| $d_2 = 0.035$ | | |
| $r_3 = -1.698$ (aspherical surface) | | |
| $d_3 = 0.025$ | $n_2 = 1.84666$ | $\nu_2 = 23.88$ |
| $r_4 = 0.907$ | | |
| $d_4 = 0.071$ | | |
| $r_5 = 0.574$ | | |
| $d_5 = 0.116$ | $n_3 = 1.53256$ | $\nu_3 = 45.91$ |
| $r_6 = -0.442$ | | |
| $d_6 = 0.172$ | | |
| $r_7 = -0.209$ (aspherical surface) | | |
| $d_7 = 0.060$ | $n_4 = 1.49109$ | $\nu_4 = 57.00$ |
| $r_8 = -0.657$ | | | coefficient of aspherical surface
$A_2^{(3)} = 0$, $A_4^{(3)} = -2.412$, $A_6^{(3)} = -2.805 \times 10^1$,
$A_8^{(3)} = 7.508 \times 10^2$, $A_{10}^{(3)} = -1.509 \times 10^4$

Embodiment 3 -continued
$f = 1$, $F/2.8$, $2\omega = 63.2°$ $A_2^{(7)} = 0$, $A_4^{(7)} = -2.987$, $A_6^{(7)} = 3.732 \times 10^2$,
$A_8^{(7)} = -1.468 \times 10^4$, $A_{10}^{(7)} = 2.734 \times 10^5$
$\Delta x_3 = -1.895 \times 10^{-3}$
$\Delta x_7 = 2.244 \times 10^{-3}$
$\nu_1 - \nu_2 = 31.64$
telephoto ratio 0.99

Embodiment 4
$f = 1$, $F/2.8$, $2\omega = 64°$

| | | |
|---|---|---|
| $r_1 = 0.304$ | | |
| $d_1 = 0.079$ | $n_1 = 1.69680$ | $\nu_1 = 55.52$ |
| $r_2 = 0.573$ | | |
| $d_2 = 0.033$ | | |
| $r_3 = -1.515$ (aspherical surface) | | |
| $d_3 = 0.024$ | $n_2 = 1.84666$ | $\nu_2 = 23.88$ |
| $r_4 = 1.186$ | | |
| $d_4 = 0.072$ | | |
| $r_5 = 0.590$ | | |
| $d_5 = 0.093$ | $n_3 = 1.53172$ | $\nu_3 = 48.9$ |
| $r_6 = -0.479$ | | |
| $d_6 = 0.039$ | | |
| $r_7 = -0.213$ (aspherical surface) | | |
| $d_7 = 0.142$ | $n_4 = 1.49109$ | $\nu_4 = 57.00$ |
| $r_8 = -0.672$ | | | coefficient of aspherical surface
$A_2^{(3)} = 0$, $A_4^{(3)} = -2.287$, $A_6^{(3)} = -2.262 \times 10^1$,
$A_8^{(3)} = 5.042 \times 10^2$, $A_{10}^{(3)} = -9.038 \times 10^3$
$A_2^{(7)} = 0$, $A_4^{(7)} = -3.975$, $A_6^{(7)} = 2.991 \times 10^2$,
$A_8^{(7)} = -1.135 \times 10^4$, $A_{10}^{(7)} = 1.843 \times 10^5$
$\Delta x_3' = -1.907 \times 10^{-3}$
$\Delta x_7' = -1.157 \times 10^{-4}$
$\nu_1 - \nu_2 = 31.64$
telephoto ratio 1.01

In respective embodiments shown in the above, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lenses.

As it will be understood from respective embodiments shown in the above, the photographic lens system according to the present invention is very compact in size and has a large aperture ratio, i.e., F/2.8.

I claim:

1. A photographic lens system with a short overall length comprising:
   first, second, third and fourth lens components wherein said first lens component is a positive meniscus lens arranged to be convex toward the object side, said third lens component is a biconvex lens, and said fourth lens component is a negative meniscus lens arranged to be concave toward the object side, and in which the surface on the object side of said second lens component is arranged as an aspherical surface expressed by the formula shown below, where, reference symbol $r_i$ represents the radii of curvature of the vertex portions of said aspherical surfaces, reference symbol x represents the distances from arbitrary points on said aspherical surfaces to the tangential planes which are tangential to said aspherical surfaces at the vertexes thereof, and reference symbol y represents the distances from said arbitrary points to the optical axis and, moreover, the amount of deviation $\Delta_3'$ in x axis direction of said aspherical surface of said second lens component from its reference spherical surface at the position of the maximum effective diameter thereof fulfills the condition (1) shown below:

$$x = \frac{\frac{y^2}{r_i}}{1 + \sqrt{1 - \left(\frac{y}{r_i}\right)^2}} + \Delta x_i \quad (1)$$

$$\Delta x_i = A_2^{(i)} y^2 + A_4^{(i)} y^4 + A_6^{(i)} y^6 + A_8^{(i)} y^8 + A_{10}^{(i)} y^{10}$$

$$-2.5 \times 10^{-3} < \frac{\Delta x_3'}{f} < 0$$

where, reference symbols $A_2^{(i)}, A_4^{(i)}, \ldots A_{10}^{(i)}$ respectively represent coefficients of aspherical surface, and reference symbol f represents the focal length of the lens system as a whole; and wherein at least one of the surfaces of said fourth lens component is arranged as an aspherical surface.

2. A photographic lens system with a short overall length according to claim 1, in which the surface on the object side of said fourth lens component is arranged as an aspherical surface expressed by the formula shown below, where, the amount of deviation x' in x axis direction of said aspherical surface of said fourth lens component from its reference spherical surface at the position of the maximum effective diameter thereof fulfills the condition (2) shown below:

$$x = \frac{\frac{y^2}{r_i}}{1 + \sqrt{1 - \left(\frac{y}{r_i}\right)^2}} + \Delta x_i$$

$$\Delta x_i = A_2^{(i)} y^2 + A_4^{(i)} y^4 + A_6^{(i)} y^6 + A_8^{(i)} y^8 + A_{10}^{(i)} y^{10}$$

$$\left|\frac{\Delta x_7}{f}\right| < 5.5 \times 10^{-3} \quad (2)$$

where, reference symbols $A_2^{(i)}, A_4^{(i)}, \ldots A_{10}^{(i)}$ respectively represent coefficients of aspherical surface, and reference symbol f represents the focal length of the lens system as a whole.

3. A photographic lens system with a short overall length according to claim 2 arranged to further fulfill the conditions (3), (4) and (5) shown below:

$$r_3 < -1.3f \quad (3)$$

$$\nu_1 - \nu_2 > 20 \quad (4)$$

$$0.07f < d_5 < 0.15f \quad (5)$$

where, reference symbol $r_3$ represents the radius of curvature of the vertex portion of the surface on the object side of the second lens component, reference symbols $\nu_1$ and $\nu_2$ respectively represent Abbe's numbers of the first and second lens compoennts, and reference symbol $d_5$ represents the thickness of the third lens component.

4. A photographic lens system with a short overall length according to claim 3, in which said photographic lens system with a short overall length has the following numerical data:

| $f = 1$, F/2.8, $2\omega$ 64.1° | | | |
|---|---|---|---|
| $r_1 = 0.340$ | | | |
| $d_1 = 0.115$ | $n_1 = 1.77250$ | | $\nu_1 = 49.66$ |
| $r_2 = 0.666$ | | | |
| $d_2 = 0.025$ | | | |
| $r_3 = -2.056$ (aspherical surface) | | | |
| $d_3 = 0.023$ | $n_2 = 1.80519$ | | $\nu_2 = 25.43$ |
| $r_4 = 0.721$ | | | |
| $d_4 = 0.071$ | | | |
| $r_5 = 0.588$ | | | |
| $d_5 = 0.128$ | $n_3 = 1.51742$ | | $\nu_3 = 52.41$ |
| $r_6 = -0.464$ | | | |
| $d_6 = 0.196$ | | | |
| $r_7 = -0.219$ (aspherical surface) | | | |
| $d_7 = 0.047$ | $n_4 = 1.48749$ | | $\nu_4 = 70.15$ |
| $r_8 = -0.552$ | | | |
| coefficient of aspherical surface | | | |
| $A_2^{(3)} = 0$, $A_4^{(3)} = -1.612$, $A_6^{(3)} = -7.141 \times 10^1$ | | | |
| $A_8^{(3)} = 2.840 \times 10^3$, $A_{10}^{(3)} = -4.707 \times 10^4$ | | | |
| $A_2^{(7)} = 0$, $A_4^{(7)} = -3.676$, $A_6^{(7)} = 4.309 \times 10^2$ | | | |
| $A_8^{(7)} = -1.483 \times 10^4$, $A_{10}^{(7)} = 2.300 \times 10^5$ | | | |
| $\Delta x_3' = -1.429 \times 10^{-3}$ | | | |
| $\Delta x_7' = 4.861 \times 10^{-3}$ | | | |
| $\nu_1 - \nu_2 = 24.23$ | | | |
| telephoto ratio 1.00 | | | | where, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively repesent refractive indices of respective lenses, and reference symbols $\nu_1$, $\nu_2$, $\nu_3$ and $\nu_4$ respectively represent Abbe's numbers of respective lenses.

5. A photographic lens system with a short overall length according to claim 2, 3 or 4, in which said photographic lens system with a short overall length has the following numerical data:

| $f = 1$, F/2.8, $2\omega = 63.4°$ | | | |
|---|---|---|---|
| $r_1 = 0.315$ | | | |
| $d_1 = 0.108$ | $n_1 = 1.74100$ | | $\nu_1 = 52.68$ |
| $r_2 = 0.547$ | | | |
| $d_2 = 0.029$ | | | |
| $r_3 = -1.703$ (aspherical surface) | | | |
| $d_3 = 0.023$ | $n_2 = 1.84666$ | | $\nu_2 = 23.88$ |
| $r_4 = 0.984$ | | | |
| $d_4 = 0.070$ | | | |
| $r_5 = 0.566$ | | | |
| $d_5 = 0.116$ | $n_3 = 1.51742$ | | $\nu_3 = 52.41$ |
| $r_6 = -0.456$ | | | |
| $d_6 = 0.177$ | | | |
| $r_7 = -0.211$ (aspherical surface) | | | |
| $d_7 = 0.050$ | $n_4 = 1.48749$ | | $\nu_4 = 70.15$ |
| $r_8 = -0.563$ | | | |
| coefficient of aspherical surface | | | |
| $A_2^{(3)} = 0$, $A_4^{(3)} = -2.143$, $A_6^{(3)} = -3.757 \times 10^1$ | | | |
| $A_8^{(3)} = 1.263 \times 10^3$, $A_{10}^{(3)} = -2.275 \times 10^4$ | | | |
| $A_2^{(7)} = 0$, $A_4^{(7)} = -3.199$, $A_6^{(7)} = 3.664 \times 10^2$ | | | |
| $A_8^{(7)} = -1.348 \times 10^4$, $A_{10}^{(7)} = 2.350 \times 10^5$ | | | |
| $\Delta x_3' = -1.606 \times 10^{-3}$ | | | |
| $\Delta x_7' = 3.110 \times 10^{-3}$ | | | |
| $\nu_1 - \nu_2 = 28.8$ | | | |
| telephoto ratio 1.00 | | | | where, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lenses.

6. A photographic lens system with a short overall length according to claim 2, 3 or 4, in which said photographic lens system with a short overall length has the following numerical data:

$f = 1$, $F/2.8$, $2\omega = 63.2°$ $r_1 = 0.300$
$d_1 = 0.084$    $n_1 = 1.69680$    $\nu_1 = 55.52$
$r_2 = 0.585$
$d_2 = 0.035$
$r_3 = -1.698$ (aspherical surface)
$d_3 = 0.025$    $n_2 = 1.84666$    $\nu_2 = 23.88$
$r_4 = 0.907$
$d_4 = 0.071$
$r_5 = 0.574$
$d_5 = 0.116$    $n_3 = 1.53256$    $\nu_3 = 45.91$
$r_6 = -0.442$
$d_6 = 0.172$
$r_7 = -0.209$ (aspherical surface)
$d_7 = 0.060$    $n_4 = 1.49109$    $\nu_4 = 57.00$
$r_8 = -0.657$ coefficient of aspherical surface $A_2^{(3)} = 0$, $A_4^{(3)} = -2.412$, $A_6^{(3)} = -2.805 \times 10^1$,
$A_8^{(3)} = 7.508 \times 10^2$, $A_{10}^{(3)} = -1.509 \times 10^4$
$A_2^{(7)} = 0$, $A_4^{(7)} = -2.987$, $A_6^{(7)} = 3.732 \times 10^2$,
$A_8^{(7)} = -1.468 \times 10^4$, $A_{10}^{(7)} = 2.734 \times 10^5$
$\Delta x_3' = -1.895 \times 10^{-3}$
$\Delta x_7' = 2.244 \times 10^{-3}$
$\nu_1 - \nu_2 = 31.64$
telephoto ratio 0.99 where, reference symbols $r_1$ through $r_8$ respectively represent radii of curvature of respective lens surfaces, reference symbols $d_1$ through $d_7$ respectively represent thicknesses of respective lesnes and airspaces between respective lesnes, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lesnes.

7. A photographic lens system with a short overall length according to claim 2, 3 or 4, in which said photographic lens system with a short overall length has the following numerical data:

$f = 1$, $F/2.8$, $2\omega = 64°$ $r_1 = 0.304$
$d_1 = 0.079$    $n_1 = 1.69680$    $\nu_1 = 55.52$
$r_2 = 0.573$
$d_2 = 0.033$
$r_3 = -1.515$ (aspherical surface)
$d_3 = 0.024$    $n_2 = 1.84666$    $\nu_2 = 23.88$
$r_4 = 1.186$
$d_4 = 0.072$
$r_5 = 0.590$
$d_5 = 0.093$    $n_3 = 1.53172$    $\nu_3 = 48.9$
$r_6 = -0.479$
$d_6 = 0.039$
$r_7 = -0.213$ (aspherical surface)
$d_7 = 0.142$    $n_4 = 1.49109$    $\nu_4 = 57.00$
$r_8 = -0.672$ coefficient of aspherical surface $A_2^{(3)} = 0$, $A_4^{(3)} = -2.287$, $A_6^{(3)} = -2.262 \times 10^1$,
$A_8^{(3)} = 5.042 \times 10^2$, $A_{10}^{(3)} = -9.038 \times 10^3$
$A_2^{(7)} = 0$, $A_4^{(7)} = -3.975$, $A_6^{(7)} = 2.991 \times 10^2$,
$A_8^{(7)} = -1.135 \times 10^4$, $A_{10}^{(7)} = 1.843 \times 10^5$
$\Delta x_3' = -1.907 \times 10^{-3}$
$\Delta x_7' = -1.157 \times 10^{-4}$
$\nu_1 - \nu_2 = 31.64$
telephoto ratio 1.01 where, reference symbols $r_1$ through $r_8$ respectively represent radii of curvature of respective lens surfaces, represent symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lenses.

* * * * *